Jan. 1, 1957  H. ASCHENBRENNER  2,776,169
GRAVITATIONAL IRRIGATION ATTACHMENT
Filed March 9, 1955
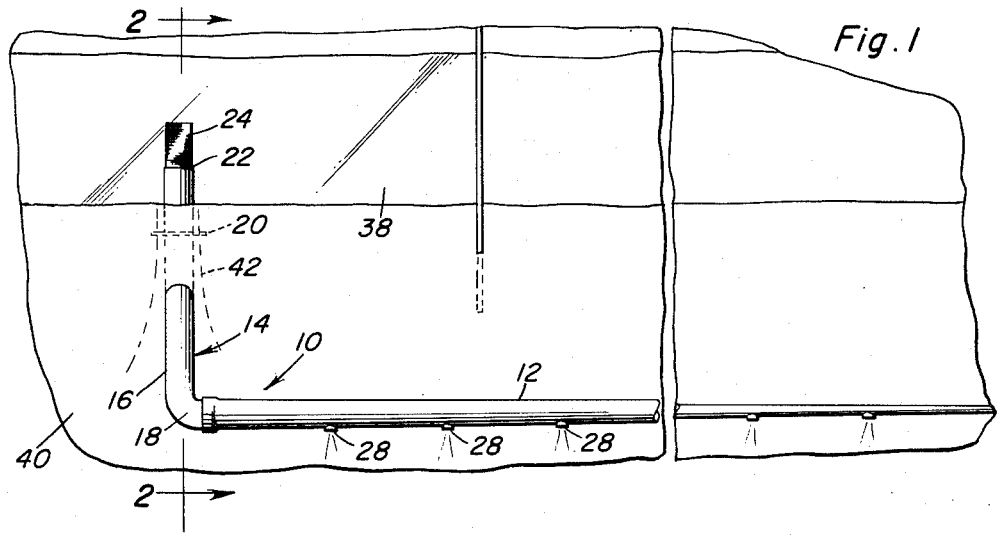
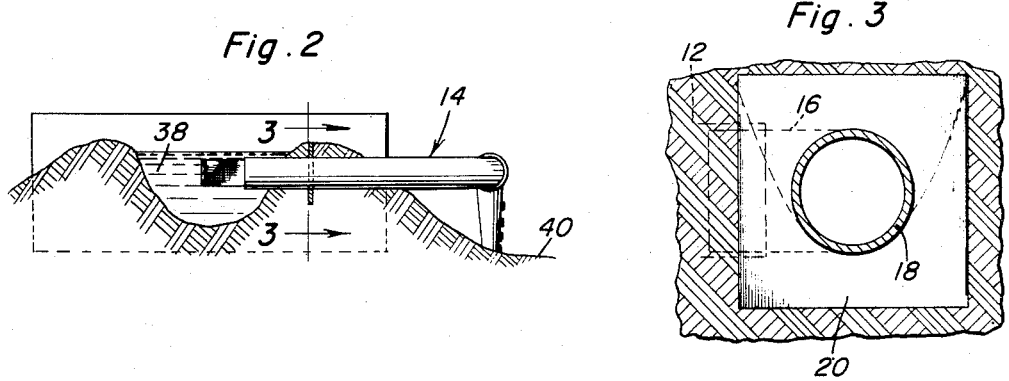
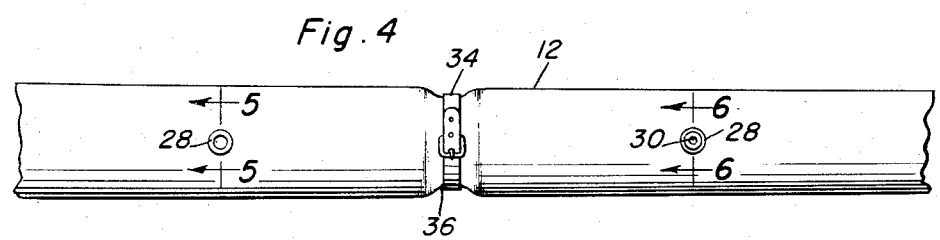
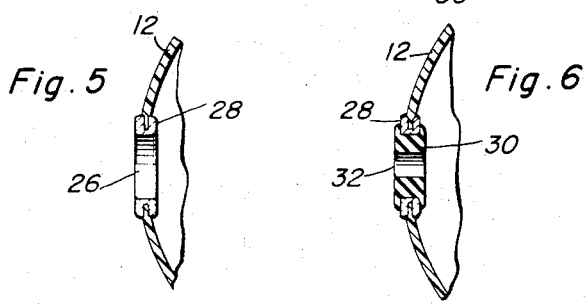
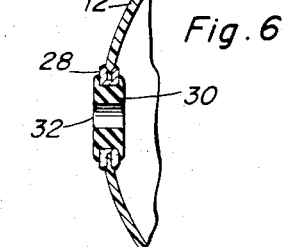
Henry Aschenbrenner
INVENTOR.

United States Patent Office 2,776,169
Patented Jan. 1, 1957

2,776,169

GRAVITATIONAL IRRIGATION ATTACHMENT

Henry Aschenbrenner, Scottsbluff, Nebr.

Application March 9, 1955, Serial No. 493,179

5 Claims. (Cl. 299—104)

This invention relates in general to new and useful improvements in irrigation apparatus, and more specifically to an improved gravitational irrigation apparatus or attachment.

Heretofore irrigation ditches have been provided at spaced intervals with dams, which are considered drop dams, in order that the water at different points in the irrigation ditch may be at different levels. Disposed adjacent the drop dams on the upstream side thereof have been provided laterals which distribute water to the fields directly from the irrigation ditch. These laterals do not fully control the flow of water from the irrigation ditch and both necessitate numerous drop dams and result in the erosion of the soil in the irrigation thereof.

It is therefore the primary object of this invention to provide an irrigation attachment which operates on the gravitational principle and which may be so connected to an irrigation ditch whereby the desired supply of water is properly distributed over the ground without the water flowing through ditches and the like.

Another object of this invention is to provide an improved irrigation attachment in the form of a flexible hose which may be readily rolled up for either storage purposes or for transportation.

Still another object of this invention is to provide an improved irrigational attachment which may be connected into a conventional irrigation ditch and which will supply by gravity water to a field, the irrigation attachment including an elongated hose having disposed at spaced intervals therealong outlets, the outlets being so constructed whereby the flow of water therethrough may be varied.

A further object of this invention is to provide an improved irrigation attachment, the irrigation attachment including a hose and means for restricting the hose at desired points whereby water may be supplied by gravitational forces through the hose and the flow therethrough controlled in order that the flow from the irrigation hose may be that desired irrespective of the particular slope of various portions of the hose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the irrigation attachment which is the subject of this invention and shows the same connected to an irrigation ditch, the intermediate portion of the attachment being omitted;

Figure 2 is a fragmentary transverse vertical sectional view taken through the irrigation ditch of Figure 1 substantially upon the plane indicated by section line 2—2 and shows the manner in which the irrigation attachment receives water from the irrigation ditch;

Figure 3 is an enlarged fragmentary sectional view taken substantially upon the plane indicated by the section line 3—3 of Figure 2 and shows the manner in which the flow of water past the connecting member of the irrigation attachment is prevented by means of a collar;

Figure 4 is an enlarged fragmentary elevational view of an intermediate portion of the irrigation hose and shows the specific details thereof including the use of a cinch for restricting the cross-section of the hose to reduce the flow of water therethrough;

Figure 5 is an enlarged fragmentary sectional view showing the details of a conventional outlet in the irrigation hose; and Figure 6 is an enlarged fragmentary sectional view taken substantially upon the plane indicated by the section line 6—6 of Figure 4 and shows a modified form of outlet.

Referring now to the drawings in detail, it will be seen that the irrigation attachment which is the subject of this invention is referred to in general by the reference numeral 10. The attachment 10 includes an elongated irrigation hose 12 and a connecting pipe or fitting which is referred to in general by the reference numeral 14. As is best illustrated in Figures 1, 2 and 3, the connecting pipe 14 is in the form of an elbow and includes an elongated straight section 16 and a relatively short straight section 18. Carried by the elongated straight section 16 adjacent the end thereof remote from the section 18 is a square collar 20, the collar 20 being suitably secured to the section 18 in sealed relation. The section 18 includes an entrance end 22 in which there is received a suitable screen 24. It is to be understood that the connecting pipe 14 may be formed of a lightweight plastic or a lightweight metal.

The hose 12 is formed of flexible plastic material and tapers longitudinally. One end of the hose 12 is telescoped over the short section 18. The other end of the hose is either reduced to a size to permit the desired flow of water through the open end thereof or is plugged. Formed in the hose 12 at suitable spaced intervals are outlets 26. The outlets 26 are formed by grommets 28 which are suitably secured to the hose 12. Inasmuch as the hose 12 is formed of a flexible plastic material, it may be readily rolled up for storage or for transportation.

Since the irrigation attachment 10 operates on a gravity flow principle, it will be readily apparent that the flow through various portions of the hose 12 will depend upon the particular slope of the hose. In order to control the flow of water out of the hose 12, certain of the openings 26 may be reduced in size by providing the grommets 28 with reducer inserts 30. The inserts 30 are preferably formed of rubber or plastic material so that they may be snapped into place within the grommets 28. The inserts 30 have reduced openings 32 of any desired size.

Although it is normally not necessary, in order to control flow through the hose 12 in the case of an unusual slope, a cinch belt 34 may be utilized. The cinch belt 34 is tightened about an intermediate portion of the hose 12 to provide for a reduced cross-section as at 36. Thus the flow of water into a particular sloping portion of the hose 12 may be controlled by tightening or loosening the cinch belt 34 as desired.

Referring now to Figures 1 and 2 in particular, it will be seen that water is supplied to the irrigation attachment 10 from an irrigation ditch 38 which runs through the field 40 to be irrigated. The irrigation ditch 38 normally will be disposed slightly above the level of the surrounding field 40 so that the flow of water through the irrigation attachment 10 will be directed from the ditch 38 onto an adjoining portion of the field 40. In order to place the irrigation attachment 10, a cut 42 is made transversely of the ditch 38 at the desired level. An intermediate portion of the straight section 16 is then placed in the cut 42 with the collar 20 resting upon firm ground. The cut 42 is then filled up with the soil being packed around the pipe section 18 and the collar 20 to prevent seepage around the pipe section 18.

When the connecting pipe 14 is properly mounted with respect to the irrigation ditch 38, water will flow in through the strainer 24 into the inlet end 22 of the section 16. The water will then pass into the section 18 after which it will flow into the hose 12 and be distributed from the hose 12.

From the foregoing description of the invention, it will be readily apparent that the irrigation attachment 10 may be quickly and easily set with respect to the irrigation ditch 38 and that complete control of the flow of water is obtainable with very little effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An irrigation attachment comprising an elongated hose, said hose being formed of collapsible, flexible material, grommets set in said hose at longitudinally spaced intervals, said grommets defining outlets, and removable reducer inserts disposed in certain of said grommets to reduce the size of said outlets, said inserts being resilient and each having a peripheral recess receiving one of said grommets.

2. An irrigation attachment comprising an L-shaped connecting pipe having a first end adapted to be placed in an irrigation ditch and a second end, an elongated hose having one end connected to said second end, said hose being formed of collapsible, flexible material, grommets set in said hose at longitudinally spaced intervals, said grommets defining outlets, and removable reducer inserts disposed in certain of said grommets to reduce the size of said outlets.

3. An irrigation attachment comprising an elongated hose, said hose being formed of collapsible, flexible material, grommets set in said hose at longitudinally spaced intervals, said grommets defining outlets, and removable reducer inserts disposed in certain of said grommets to reduce the size of said outlets, and a cinch releasably encircling an intermediate portion of said hose and selectively decreasing the cross-section thereof to control the flow of water through said hose.

4. An irrigation attachment comprising an elongated hose, said hose being formed of collapsible, flexible material, grommets set in said hose at longitudinally spaced intervals, said grommets defining outlets, and removable reducer inserts disposed in certain of said grommets to reduce the size of said outlets, said inserts being resilient and each having a peripheral recess receiving one of said grommets, and a cinch releasably encircling an intermediate portion of said hose and selectively decreasing the cross-section thereof to control the flow of water through said hose.

5. An irrigation attachment comprising an L-shaped connecting pipe having a first end adapted to be placed in an irrigation ditch and a second end, an elongated hose having one end connected to said second end, said hose being formed of collapsible, flexible material, grommets set in said hose at longitudinally spaced intervals, said grommets defining outlets, and removable reducer inserts disposed in certain of said grommets to reduce the size of said outlets, said inserts being resilient and each having a peripheral recess receiving one of said grommets.

References Cited in the file of this patent

UNITED STATES PATENTS

| | | |
|---|---|---|
| Re. 14,081 | Linxweiler | Mar. 7, 1916 |
| 1,143,351 | Benson | June 15, 1915 |
| 2,314,525 | Summers | Mar. 23, 1943 |
| 2,566,833 | Healy | Sept. 4, 1951 |
| 2,621,075 | Sedar | Dec. 9, 1952 |